United States Patent [19]

Sasuta

[11] Patent Number: 5,274,842
[45] Date of Patent: Dec. 28, 1993

[54] METHOD FOR MORE EFFICIENT MULTI TRANSACTION DATA TRANSMISSION

[75] Inventor: Michael D. Sasuta, Mundelein, Ill.
[73] Assignee: Motorola, Inc., Schaumburg, Ill.
[21] Appl. No.: 828,091
[22] Filed: Jan. 30, 1992
[51] Int. Cl.$^5$ ............................................. H04Q 7/00
[52] U.S. Cl. .................................... 455/34.1; 455/74; 455/54.1; 455/67.1; 358/439
[58] Field of Search .................. 455/34.1, 54.1, 54.2, 455/57.1, 67.1, 68, 69, 56.1, 34.2; 358/439, 406, 405, 434, 468; 340/825.44, 825.52

[56] References Cited

U.S. PATENT DOCUMENTS

| | | | |
|---|---|---|---|
| 4,153,916 | 5/1979 | Miwa et al. | 358/439 |
| 4,613,990 | 9/1986 | Halpern | 455/69 |
| 4,922,546 | 5/1990 | Takahashi et al. | 455/74 |

Primary Examiner—Reinhard J. Eisenzopf
Assistant Examiner—Philip J. Sobutka
Attorney, Agent, or Firm—Timothy W. Markison; Steve Parmelee

[57] ABSTRACT

In a trunked communication system that has the capabilities of receiving facsimile transmissions from a communication unit, a method to more efficiently utilize communication resources can be achieved by the following. Once a communication resource allocator has allocated a communication resource to a communication unit for a predetermined period of time, that communication unit transmits at least a portion of a multiple transaction data, which may be a facsimile, to the communication resource allocator. Once the communication resource allocator accurately receives the at least a portion of the multiple transaction data, it transmits an acknowledgement signal to the communication unit. From the acknowledgement signal, the communication unit determines the signal strength of the transmission and also the transmission duration. From these parameters, the communication unit then determines whether at least a second portion of the multiple transaction data can be transmitted within the remaining portion of the allocated predetermined period of time.

12 Claims, 4 Drawing Sheets

METHOD FOR MORE EFFICIENT MULTI TRANSACTION DATA TRANSMISSION

FIELD OF THE INVENTION

This invention relates generally to trunked communication systems and in particular to a method that enables a communication unit to more efficiently utilizes an allocated communication resource to transmit multiple transaction data.

BACKGROUND OF THE INVENTION

Trunking communication systems are known to comprise a plurality of communication units that are arranged into a predetermined number of talk groups, a limited number of communication resources that are transceived via a predetermined number of repeaters, or base stations, and a communication resource allocator that allocates the limited number of communication resources among the plurality of communication units. The communication resources may comprise a TDM bus, a carrier frequency, a pair of frequency carriers, or any other RF transmission means. Communication units, which may be mobile units or portable radio units, are arranged into talk groups by like function. For example, one talk group may comprise communication units utilized by a police force, while another talk group may comprise communication units utilized by a fire department.

With technological advances, a trunked communication system can perform more and more advanced services. For example, recent advancements in the art have made it possible for a communication unit to transmit multiple transaction data, such as facsimiles or similar type data. When a communication unit is to transmit a multiple transaction data, such as a facsimile, the communication unit transmits a request to the communication resource allocator to perform such a service. The communication resource allocator, when it grants the communication unit's request, allocates a communication resource to the communication unit for a predetermined period of time. The predetermined period of time is based on an average transmission time of a portion of the multiple transaction data, for example, the time to transmit one page of a facsimile.

In many instances, when the quality of the control channel is high for that particular communication unit, it can transmit the first page of the facsimile in a shorter period of time than has been allocated. However, the communication unit does not transmit any subsequent pages of the facsimile, or portions of the multiple transaction data, during the remaining time that has been allocated to it. The communication units sits idle until the predetermined period of time expires, then it requests another transmission to transmit more of the multiple transaction data, if any exists. Therefore, a need exists for a method that will efficiently utilize the allocated communication resource to transmit multiple transaction data during a predetermined period of time.

SUMMARY OF THE INVENTION

This need and others are substantially met by the method for more efficient multiple transaction data transmission disclosed herein. In a trunked communication system that comprises a plurality of communication units, a limited number of communication resources that are transceived via a predetermined number of repeaters, and a communication resource allocator that allocates the limited number of communication resources among the plurality of communication units, wherein, from time to time, a communication unit transmits multiple transaction data via an allocated communication resource, and wherein the communication unit has the allocated communication resource for a predetermined period of time, the following describes a method that enables the communication unit to more efficiently utilize the allocated communication resource. Once the communication resource allocator has allocated the communication resource to the communication unit for a predetermined period of time, the communication unit transmits at least a portion of the multiple transaction data to the communication resource allocator. Once transmitted, the communication unit receives an acknowledgement from the communication resource allocator that the at least a portion of the multiple transaction data was received. The communication unit then determines the signal strength of the transmission of the at least a portion of the multiple transaction data and determines the transmission duration of the at least a portion of the multiple transaction data. Having determined these parameters, the communication unit determines whether at least a second portion of the multiple transaction data is transmittable within the remaining portion of the predetermined period of time, if at least a second portion of the multiple transaction data exists.

DESCRIPTION OF A PREFERRED EMBODIMENT

Figure 1:
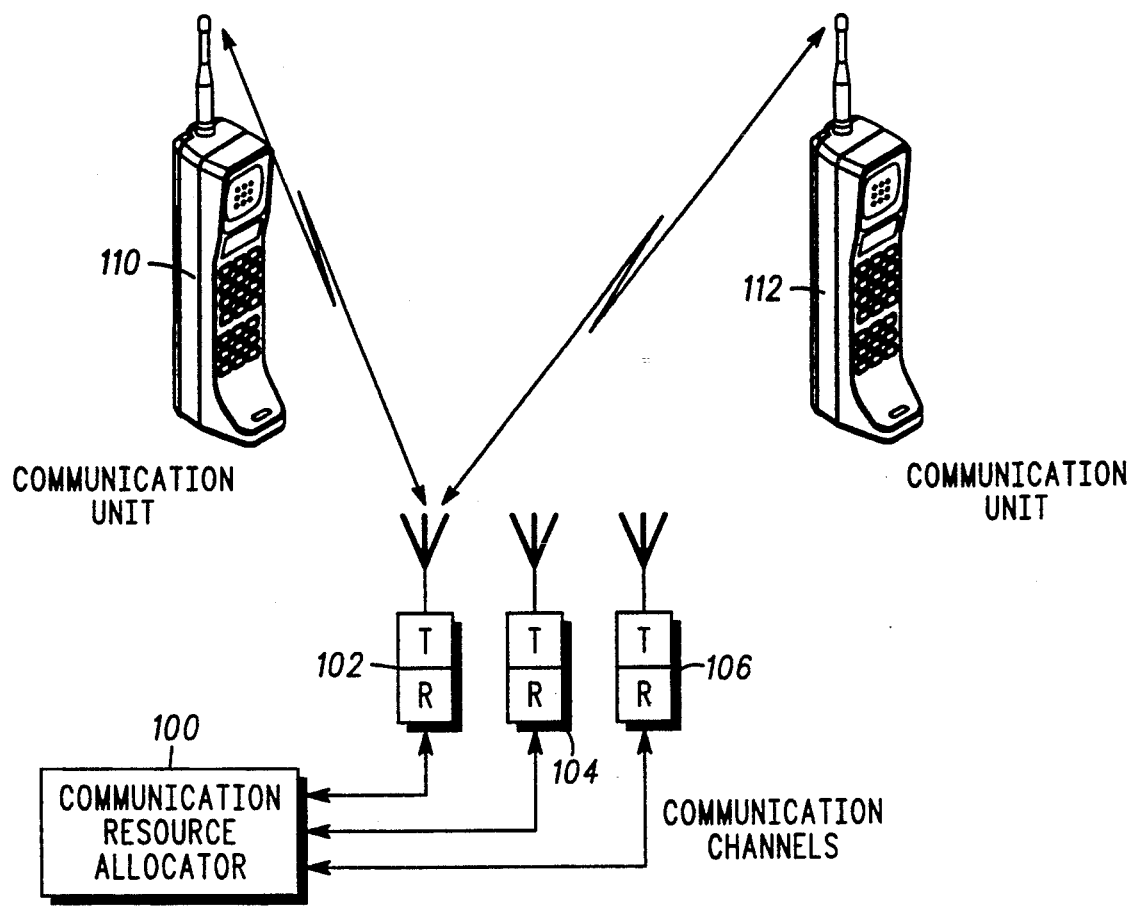
FIG. 1 is a block diagram of a trunking communication system.

FIG. 1 illustrates a trunking communication system that comprises a communication resource allocator (CRA) 100, a set of repeaters 102–106, and a plurality of communication units (CU) (two shown) 110, 112. At least one of the repeaters is designated as the control channel, repeater 102 in FIG. 1, while the other repeaters are traffic channels, 104–106. The control channel is used to transceive operational data between the communication units 110–112 and the CRA 100. Operational data is known to comprise inbound signalling words (ISW) and outbound signalling words (OSW) that allow the communication units to function within the communication system. For example, a CU may request allocation of a traffic channel to perform or access a service. The CRA processes the request and determines whether there is an available traffic channel. If there is one, the CRA informs the CU of the traffic channel assigned to it. The CU uses the assigned traffic channel for the requested service operation. When the CU has performed the requested service operation, it releases the traffic channel.

Figure 2:
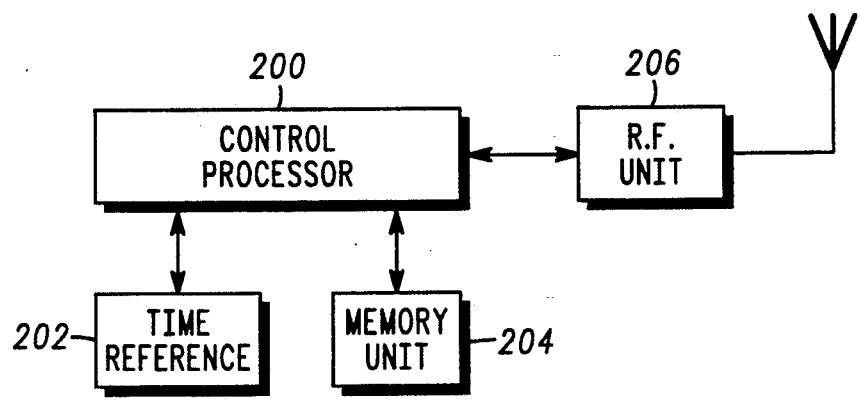
FIG. 2 is a block diagram of the communication unit capable of supporting the method for more efficient multi-transaction data transmission operations.

FIG. 2 illustrates a communication unit that includes a control processor 200, a time reference 202, a memory unit 204, and an RF unit 206. As is known, the control processor 200, which may be a microprocessor, directs all operations of the CU within the trunking communication system. This includes requesting services, recovering service responses, and processing system updates. The control processor 200 also controls traffic channel operations and controls the service being performed on the control channel and any assigned traffic channel. The RF unit 206, as is known, allows the CU to interface with the traffic repeaters and handles all the physical receive and transmit operations upon the appropriate frequencies of the control and traffic channels. The memory unit 204, which may be a RAM or other digital storage memory device, retains unique information concerning transmission characteristics of special multi-transaction data transmission service. In specific, the memory unit 204 contains the transaction transmit time history, the average transaction transmit time, the signalling quality history, and the allowed resource time. The time reference unit 202 provides real-time information to the control processor 200 which is used to determine the time it took to transmit multi-transaction data.

Figure 3A:
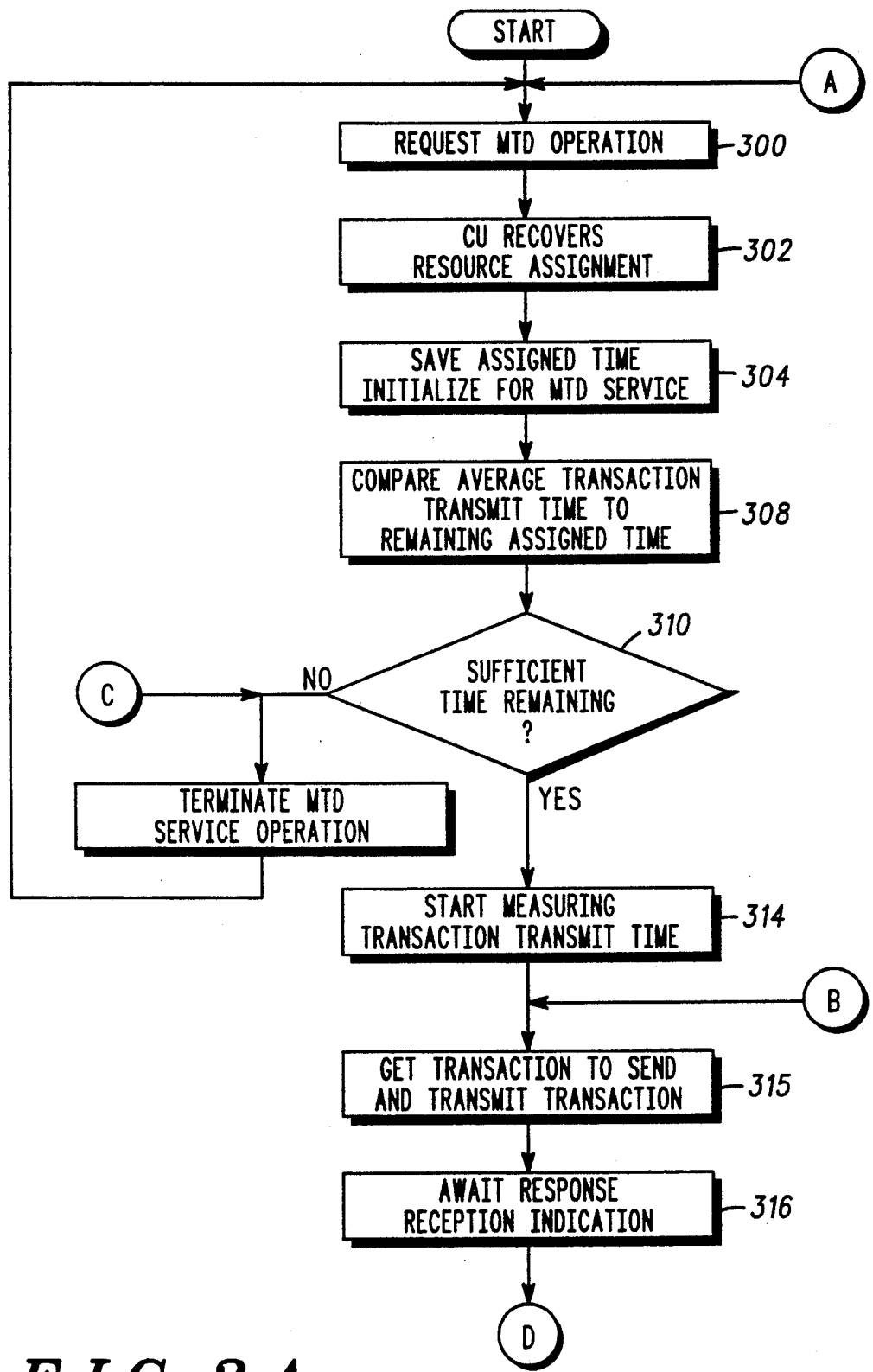
FIG. 3a–c is a flow diagram executed by the communication unit when processing the multi-transaction data transmission operation.
Figure 3B:
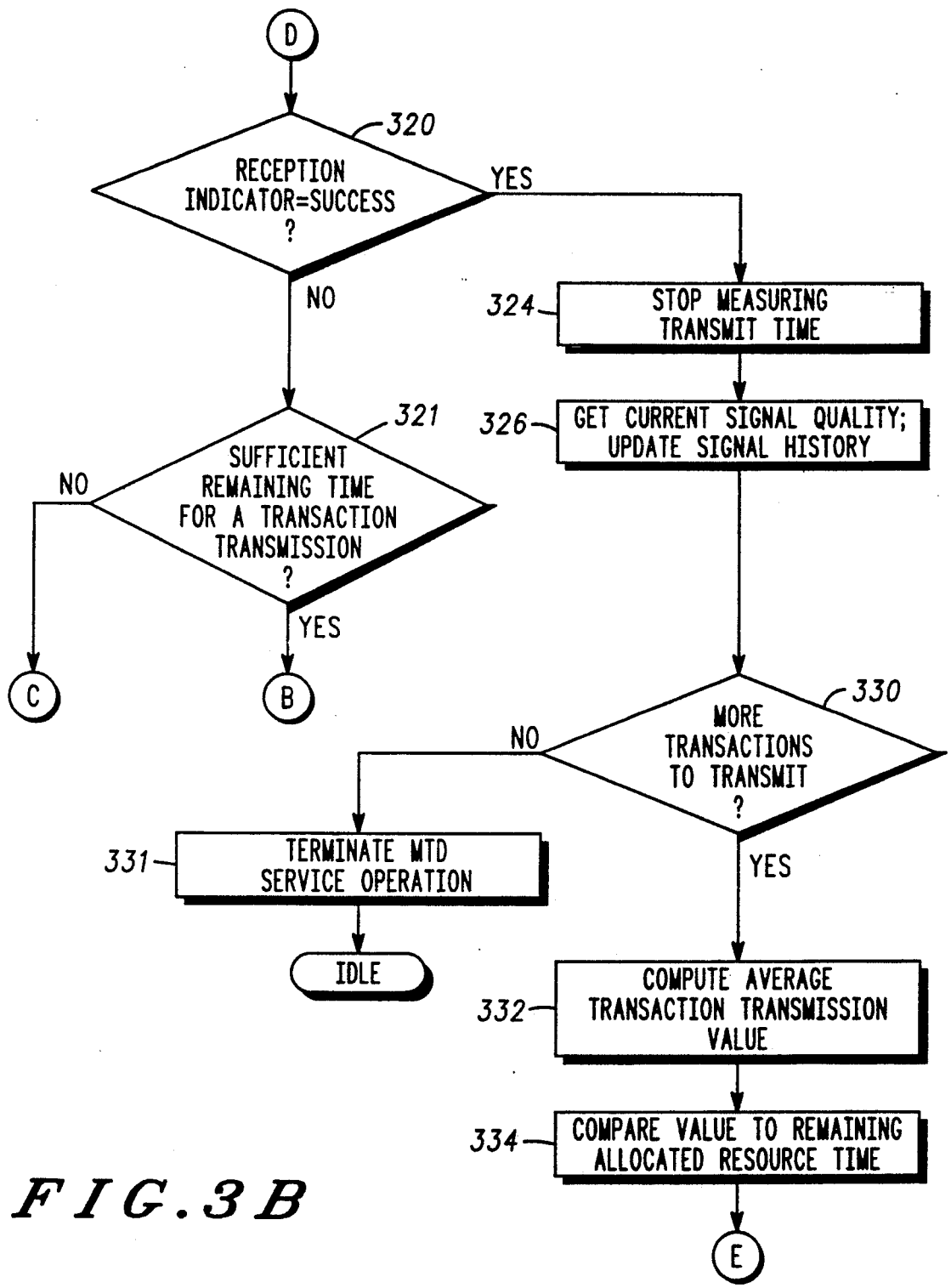
Figure 3C:
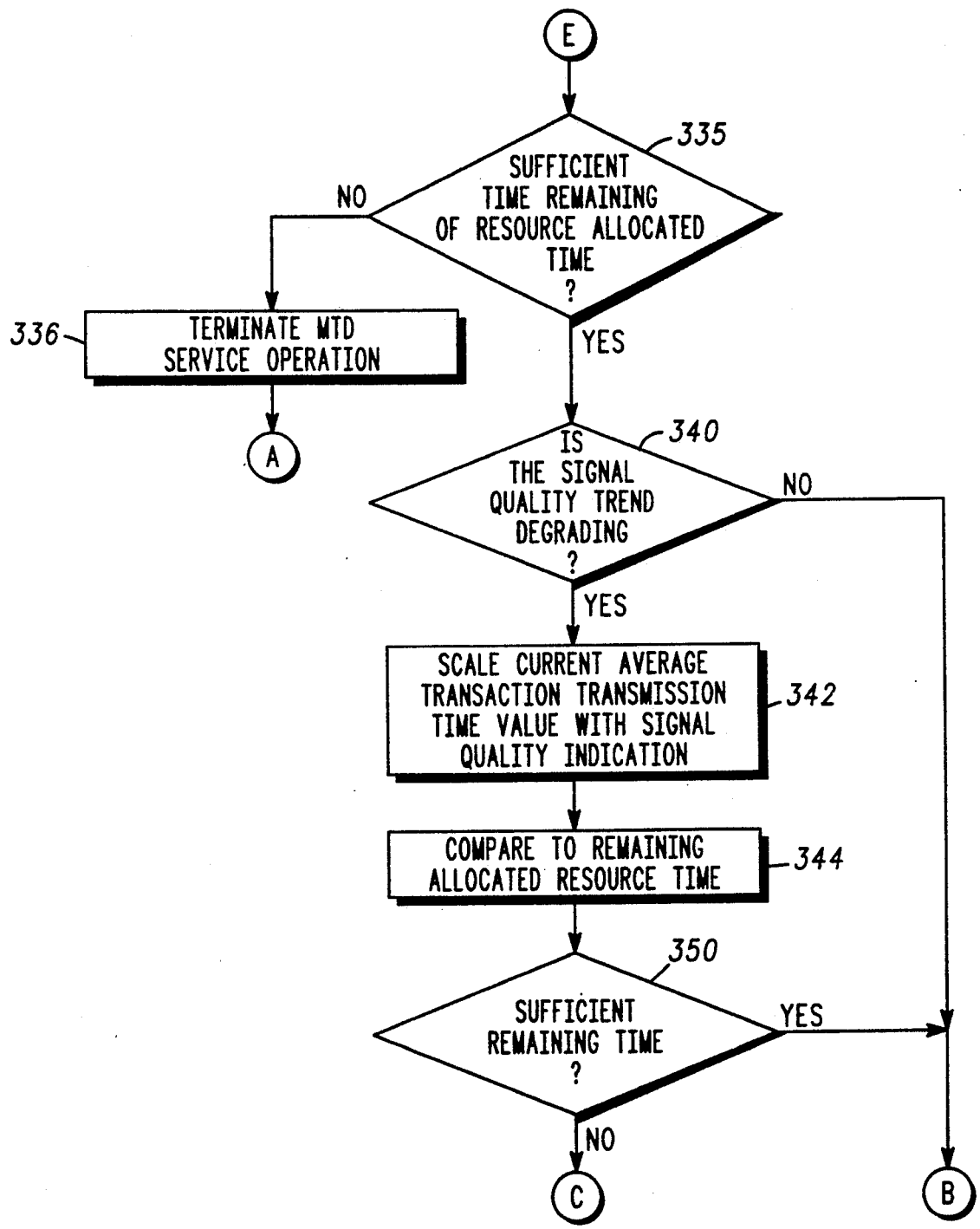

FIG. 3 illustrates an operation that a CU can perform to more efficiently transmit multi-transaction data in a trunking communication system. At step 300, the control processor of the CU requests service for a multi-transaction data (MTD) operation (e.g. facsimile). Upon receipt of the request, the CRA assigns a traffic channel resource the requesting CU such that the CU can perform the requested MTD service. This resource is assigned to the requesting CU for a predetermined period of time (500 mSec to 5 Sec). The CRA determines the length of the predetermined period of time based on the current loading of the traffic channels and the anticipated average time for completion of at least some portion of the requested multi transaction data operation (e.g. a page of a facsimile). When the CRA responds to the request, the response will include the predetermined period of time and which traffic channel was assigned to it.

At step 302, the control processor receives the response and stores the predetermined period of time that the resource is available to the CU in the memory unit. Having done this, the control processor begins an elapsed time counter for the processing of this requested service using the timer reference. In addition, the control processor initializes an ongoing sum of successful transaction transmission times for this service operation, the number of successful transaction transmissions, the signal quality history values, the transaction transmission time history, and the average transaction transmission time for this service operation and stores it in the memory unit 304.

At step 308, the control processor compares the current average transaction transmission value to the amount of time remaining of the allotted resource time assigned by the CRA at the initial service assignment phase 310. If there is not enough remaining resource assignment time, 312, the control processor will terminate this service operation with the CRA. The CRA will reclaim the assigned resource for future assignment for other service needs. The control processor will request the MTD service of the CRA again without user intervention to complete the service request (e.g. to retransmit the remaining pages of a facsimile). When the CRA assigns a resource to this service request, the control processor will begin the operation with this transaction.

If there is sufficient time, 314, the CU starts measuring the time for the transmission of this transaction for the requested service (e.g. a page of the facsimile). The unit transmits the transaction data operation for the requested service 315. Upon completion of the transmission of this entire transaction of the service operation 316, the control processor awaits a reception indication from the CRA that the CRA received the transmission. When the CRA responds, the control processor recovers the response 320 and determines the condition of the last transaction transmission. If this transaction was successfully recovered by the CRA, a success indication is presented to the transmitting unit such that more transactions may be transmitted. (Optionally the reception indication could also indicate the overall signalling quality as perceived from the CRA perspective for this transaction.) With the response indicating successful transmission, the control processor stops measuring the amount of time being used for the successful transmission 324 and determines the current signalling quality at the CU with respect to the signalling from the CRA 326.

After a successful transmission of at least a portion of the multi-transaction data, the control processor determines whether the entire multi-transaction data has been transmitted 330. If it's all been transmitted, the control processor terminates this service operation with the CRA and assumes an idle condition 331. The CRA will reclaim the assigned traffic channel for future availability to satisfy other service needs.

When a portion of the multi-transaction data still needs to be transmitted 330, the control processor adds the transaction transmission timer value to the ongoing sum of transaction transmission times for this particular MTD service. From this, the control processor computes a current average transaction transmission time using the ongoing sum and the number of transactions successfully sent for this particular service operation and compares the average transaction transmission value to the amount of time remaining of the predetermined period of time 334. If there is not enough time 335, the control processor terminates the service operation with the CRA. The CRA will reclaim the assigned resource for future assignments. Having terminated the present service operation before all the multi-transaction data has been transmitted, the control processor will subsequently request another MTD service. When the CRA assigns a resource to this service request, the control processor begins the operation with the transaction following the last successfully transmitted transaction of the service operation.

If there is sufficient remaining resource time, the control processor references the signalling quality history information to determine if the probability of successful transmission is improving, constant, or degrading. If the signalling quality indicates constant or improving, the control processor transmits the next portion of the multi-transaction data. If the signalling quality indicates degradation 342, the current average transmit time value is scaled inversely proportional to the degradation trend. If this scaled average transaction transmit value is less than the remaining resource time 350, the control processor transmits the next portion of the multi-transaction data. If there is insufficient remaining resource time, the control processor terminates the service operation with the CRA. The CRA will reclaim the assigned traffic channel for future assignments. Having terminated the present service request before all the multi-transaction data has been transmitted, the control processor requests another MTD service. When the CRA assigns a resource to this service request, the control processor begins the operation with the transaction following the last successfully transmitted transaction of the service operation.

If this transaction was unsuccessfully received by the CRA, the control processor determines whether the remaining resource assignment time, predetermined period of time, is greater than the average transaction transmission time. If there is sufficient remaining resource time, the control processor transmits the transaction again as outlined above. If there is not enough remaining resource assignment time, the control processor terminates the service operation with the CRA. The CRA reclaims the assigned traffic channel for future assignments. Having terminated the service operation before all the multi-transaction data was transmitted, the control processor will request the MTD service of the CRA again. When the CRA assigns a resource to this service request, the control processor begins the operation with the transaction following the last successfully transmitted transaction of the service operation.

I claim:

1. In a trunking communication system that comprises a plurality of communication units, a limited number of communication resources that are transceived via a predetermined number of repeaters, and a communication resource allocator that allocates the limited number of communication resources among the plurality of communication units, wherein, from time to time, a communication unit of the plurality of communication units transmits multiple transaction data via an allocated communication resource, and wherein the communication unit is allocated the allocated communication resource for a predetermined period of time, a method for the communication unit to more efficiently utilize the allocated communication resource to transmit the multiple transaction data during the predetermined period of time, the method comprises the steps of:
   a) upon allocation of a communication resource to the communication unit and upon receipt of said predetermined period of time, transmitting a first portion of the multiple transaction data to the communication resource allocator;
   b) receiving an acknowledgement that said first portion of the multiple transaction data was received by the communication resource allocator;
   c) determining signal strength of the transmission of said first portion of the multiple transaction data;
   d) calculating transmission duration of the first portion of the multiple transaction data; and
   e) determining, based upon the transmission duration, the predetermined period of time, and the signal strength, remaining transmission time; and
   f) transmitting at least a second portion of the multiple transaction data to the communication resource allocator when said at least a second portion of the multiple transaction data exists and when the remaining transmission time is sufficient to transmit said at least the second portion of the multiple transaction data to the communication resource allocator.

2. In the method of claim 1, wherein the determining of the signal strength of step (c) further comprises storing signal strength information of previously transmitted portions of the multiple transaction data to produce a record of signal strengths.

3. The method of claim 2 further comprises receiving additional signal strength information from the communication resource allocator based upon quality of the received at least a portion of the multiple transaction data.

4. In the method of claim 2, the determining of transmission duration of step (d) further comprises calculating transmission time based upon a time difference between when the at least a portion of the multiple transaction data began transmitting and when the acknowledgement was received.

5. The method of claim 4 further comprises storing the transmission duration of previously transmitted portions of the multiple transaction data to produce a record of transmission durations.

6. In the method of claim 5, the determining of whether the second portion of the multiple transaction data is transmittable of step (e) further comprises calculating, based upon the record of transmission durations and the record of signal strengths, whether sufficient time remains in the predetermined period of time to transmit the second portion of the multiple transaction data.

7. The method of claim 6 further comprises terminating the allocation of the communication resource when there is insufficient time to transmit the second portion of the multiple transaction data.

8. The method of claim 1 further comprises terminating the allocation of the communication resource when the second portion of the multiple transaction data does not exist.

9. In a trunking communication system that comprises a plurality of communication units, a limited number of communication resources that are transceived via a predetermined number of repeaters, and a communication resource allocator that allocates the limited number of communication resources among the plurality of communication units, wherein, from time to time, a communication unit of the plurality of communication units transmits multiple transaction data via an allocated communication resource, and wherein the communication unit is allocated the allocated communication resource for a predetermined period of time, an improved communication unit that more efficiently utilize the allocated communication resource to transmit the multiple transaction data during the predetermined period of time, the improvement comprises:
   transmission means for transmitting a first portion of the multiple transaction data to the communication resource allocator;
   receiving means for receiving an acknowledgement that said first portion of the multiple transaction data was received by the communication resource allocator;
   signal strength determination means, operably coupled to the transmission means, for determining the signal strength of the transmission of said first portion of the multiple transaction data;
   transmission duration determination means, operably coupled to the transmission means and the receiving means, for calculating transmission duration of said first portion of the multiple transaction data; and
   subsequent transmission determination means, operably coupled to the signal strength determination means and the transmission duration determination means, for determining whether sufficient transmission time remains of said predetermined period of time to transmit at least a second portion of the multiple transaction data.

10. The improved communication unit of claim 9 further comprises time storage means, operably coupled to the subsequent transmission means, for storing the predetermined period of time and remaining portions of the predetermined period of time.

11. In a trunking communication system that comprises a plurality of communication units, a limited number of communication resources that are transceived via a predetermined number of repeaters, and a communication resource allocator that allocates the limited number of communication resources among the plurality of communication units, wherein, from time to time, a communication unit of the plurality of communication units transmit multiple transaction data via an allocated communication resource, and wherein the communication unit is allocated the allocated communication resource for a predetermined period of time, a method for the trunking communication system to more efficiently utilize the allocated communication resource to transmit the multiple transaction data during the predetermined period of time, the method comprises the steps of:

a) transmitting said predetermined period of time from the communication resource allocator to the communication unit;

b) transmitting a first portion of the multiple transaction data from the communication unit to the communication resource allocator;

c) transmitting an acknowledgement that said first portion of the multiple transaction data was received by the communication resource allocator to the communication unit;

d) within the communication unit, determining signal strength of the transmission of said first portion of the multiple transaction data;

e) within the communication unit, determining transmission duration of said first portion of the multiple transaction data;

f) within the communication unit, determining, based upon the transmission duration, the predetermined period of time, and the signal strength, remaining transmission time; and f) transmitting, by the communication unit, at least a second portion of the multiple transaction data to the communication resource allocator when said at least a second portion of the multiple transaction data exists and when the remaining transmission time is sufficient to transmit said at least the second portion of the multiple transaction data to the communication resource allocator.

12. The method of claim 11 further comprises transmitting addition signal strength information from the communication resource allocator to the communication unit.

* * * * *